United States Patent [19]
Brunet et al.

[11] Patent Number: 4,706,257
[45] Date of Patent: Nov. 10, 1987

[54] GAS LASER GENERATOR AND METHOD OF OPERATING SAME

[75] Inventors: Henri Brunet, L'Hay les Roses; Michel Mabru, Bures sur Yvette; Michel Gastaud, Sainte Genevieve des Bois, all of France

[73] Assignee: Compagnie Generale d'Electricite, Paris, France

[21] Appl. No.: 802,294

[22] Filed: Nov. 27, 1985

[30] Foreign Application Priority Data

Nov. 29, 1984 [FR] France ................ 84 18183

[51] Int. Cl.⁴ ............................................. H01S 3/097
[52] U.S. Cl. ...................................... 372/88; 372/58; 372/87
[58] Field of Search .................. 372/87, 58, 88, 85

[56] References Cited

U.S. PATENT DOCUMENTS 3,671,883  6/1972  Smars ........................ 372/58
4,541,097  9/1985  Kuwabara et al. ........... 372/87

FOREIGN PATENT DOCUMENTS 0015297  9/1980  European Pat. Off.

Primary Examiner—James W. Davie
Assistant Examiner—Bertha Randolph
Attorney, Agent, or Firm—Sughrue, Mion, Zinn, Macpeak & Seas

[57] ABSTRACT

The generator comprises an optical cavity (3, 4) resonating according to an axis (2) and two annular electrodes (5, 6) disposed along said axis, one of said electrodes (5) being provided with gas injection channels (9, 10) having injection axes (11, 12) directed toward the other electrode (6) and inclined at an angle of 45° with respect to the axis (2) of the resonator, the number and the cross-section of said channels (9, 10 . . . ) being selected to enable the laser gas to be injected at supersonic speed. The operating method consists in maintaining a laser gas pressure upstream from the injection channels (9, 10) which is at least 50% greater than the downstream pressure.

6 Claims, 5 Drawing Figures

GAS LASER GENERATOR AND METHOD OF OPERATING SAME

FIELD OF THE INVENTION

This invention concerns a gas laser generator and a method of operating such a generator.

BACKGROUND OF THE INVENTION

The laser generator of the invention is of the type comprising:

means for creating a resonant optical cavity in one axis, a discharge tube arranged in the cavity along said axis, means for introducing a laser gas into the tube, means for aspirating the laser gas out of the tube, first and second electrodes each comprising a center opening, these electrodes being disposed along the said axis such as to be in contrast with the laser gas introduced into the tube, means for imparting two different electrical potentials respectively to said first and second electrodes such as to bring about between the two electrodes an electrical discharge in the laser gas contained in the tube, said discharge bringing about the formation of an axial laser radiation oscillating within the cavity and passing through the center openings of the first and second electrodes and means enabling part of the laser radiation to leave the cavity to form a laser beam.

A laser generator of this type is described in European patent application publication No. 0015297. In the generator described therein, the laser gas is introduced axially into the tube via the center opening of the first electrode and via peripheral openings in said second electrode. This generator has one drawback: its specific discharge power, in other words the maximum electric power which can be developed in the electrical discharge, divided by the volume of discharge, is limited to a relatively small value. As a result there is a corresponding limitation of the optical output power of such laser generators.

It is an object of the present invention to obviate this disadvantage and to provide particularly simple, high-powered and highly efficient gas laser generators.

SUMMARY OF THE INVENTION

The invention accordingly provides a gas laser generator of the above-mentioned type, wherein said means for introducing the laser gas into the tube include gas injection channels arranged in the first electrode, the inlet axes of said channels intersecting the axis of the resonator, being directed towards the second electrode and being inclined at an angle of substantially 45° in relation to the axis of the resonator cavity, the number and the cross-section of said channels being such that the laser gas can be injected through them into the tube at a speed at least equal to the speed of sound.

As additional features of the laser generator according to the invention, said means for injecting the laser gas into the tube can further include a chamber provided in the first electrode, which chamber can be connected to a source of laser gas and can communicate with the internal volume of the discharge tube via the said injection channels. The laser generator can further comprise means for circulating a liquid coolant through the first electrode.

In a preferred embodiment, this laser generator further comprises:

a third electrode identical to the second electrode and placed in contact with the laser gas introduced into the tube, said second and third electrodes being disposed in an intermediate section of the tube, and a fourth electrode, similar to the first electrode, placed in contact with the laser gas introduced into the tube, said first and fourth electrodes being disposed respectively in the two end portions of the tube and the injection axes of the fourth electrode being directed toward the center section of the tube.

For this embodiment, said means for imparting two different electrical potentials to the first and second electrodes respectively are also able to bring the third electrode to the same potential as the second electrode and the fourth electrode to the same potential as the first electrode.

Also, said means for aspirating the laser gas out of the tube comprise a pump whose inlet is connected via a first flow line to a tube opening located between the second and the third electrode, and whose outlet is connected via a second flow line and a third flow line to the first and fourth electrodes respectively in order to supply laser gas to their gas injection channels.

In this embodiment, two heat exchangers can be respectively disposed on the second and the third flow line.

It is another object of the invention to provide a method of operating the laser generator according to the invention, consisting in maintaining a laser gas pressure upstream from the said injection channels at least fifty percent greater than the laser gas pressure in the tube, two different electrical potentials being respectively applied to the first and second electrodes so as to bring about an electrical discharge between these electrodes, in the laser gas within the tube.

Several specific embodiments of the invention will now be described by way of example, with reference to the appended drawings.

DESCRIPTION OF PREFERRED EMBODIMENTS

Figure 1:
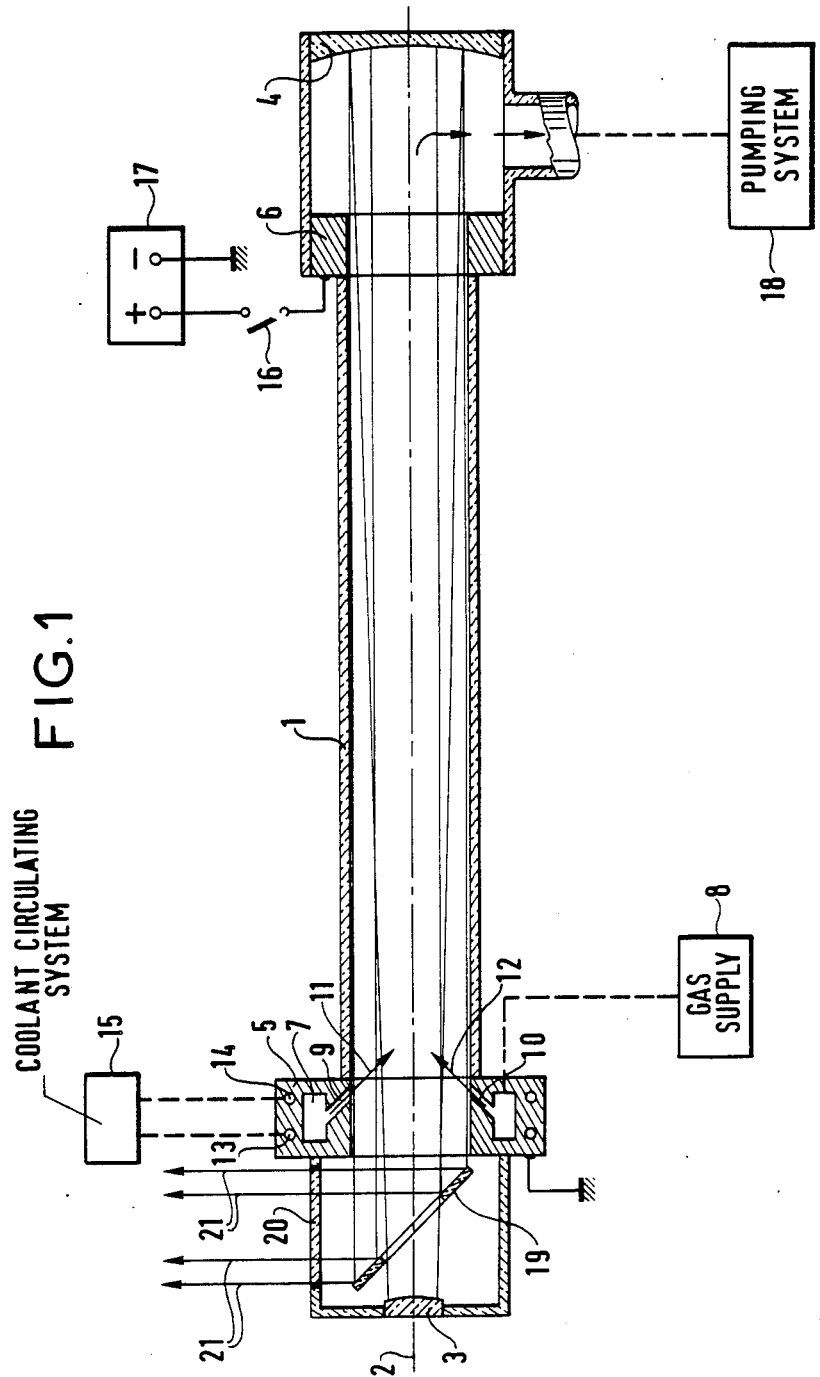
FIG. 1 is a schematic longitudinal section of one embodiment of the laser generator according to the invention.

In FIG. 1 is shown an insulating tube 1 having a basically cylindrical shape about an axis 2. The tube 1 is closed at both ends, respectively by a convex mirror 3 and a concave mirror 4. The reflective surfaces of the two mirrors face one another such as to form an unstable optical cavity resonator along the axis 2.

Two annular electrodes 5 and 6, both centered on the same axis 2, are respectively encased in the two ends of the tube 1. These electrodes may be made of copper, nickel or another conducting metal.

The electrode 5 comprises an inside annular chamber 7 which can be connected via a flow line to a laser gas source 8. The laser gas may be a mixture of carbon dioxide ($CO_2$), nitrogen ($N_2$) and helium (He) for example.

Gas injection channels such as 9 and 10 lead out of said annular chamber 7 and issue at the cylindrical inside surface of the electrode 5. Said channels define injection axes such as 11 and 12, directed toward the other electrode 6 and inclined at an angle of substantially 45° with respect to the axis 2 of the resonator cavity. The electrode 5 also comprises internal channels 13 and 14 connected to a coolant fluid circulating system 15. Electrode 6, which can consist merely of a simple metal ring without an internal chamber or channels of any type, is electrically connected to the positive terminal of a high voltage generator 17, via a switch 16. The negative terminal of generator 17, as well as electrode 5, are grounded. The tube 1 is provided with an opening in its cylindrical outside surface, between the electrode 6 and the reflective mirror 4, which is connected by means of a flow line omitted from the drawing to a pumping system 18. A plane, annular reflector 19 is placed in tube 1 between the electrode 5 and the mirror 3. Reflector 19 is disposed along the axis 2 of the tube and tilted 45° with respect to said axis. A window 20 is embedded in the cylindrical outside wall of tube 1 between electrode 5 and mirror 3 to allow a light beam reflected by reflector 19 to exit from the tube.

The operation of the laser generator described in the foregoing and illustrated in FIG. 1 will now be described.

The gas supply 8 is connected to chamber 7 to feed laser gas thereto, said gas being injected into the tube 1 through channels 9 and 10 along injection axes 11 and 12. Moreover, the pumping system 18 acts to suck out of tube 1 the laser gas having been injected therein. The number and cross-section of channels 9, 10 is selected to provide a rate of gas injection at least equal to the speed of sound. Accordingly, the pressure of the laser gas in chamber 7, upstream from the injection channels, must be kept at least 50% greater than the pressure of the laser gas inside the tube 1. In the operation of the prior art laser mentioned hereinbefore, the pressure ratio of the gas upstream from the cathode and downstream from the cathode is on the order of 1.15 to 1.

Following the closure of switch 16, electrode 6 is raised to a high potential relative to electrode 5, causing an electrical discharge charge to occur between the two electrodes in the laser gas flowing in the tube 1. This results in the formation of a laser radiation oscillating in the optical cavity resonator, between the mirrors 3 and 4, within a cylindrical volume whose axis 2 goes through center openings of the annular electrodes 5 and 6, the diameter of said volume corresponding to the inside diameters of the electrodes. Part of the energy of this radiation is drawn off by the annular reflector 19 whose internal cross-section is large enough to allow the radiation oscillating between mirrors 3 and 4 to pass therethrough; mirrow 3 has a smaller outside diameter than mirror 4, as can be seen from the figure. The beam of laser radiation drawn off by mirror 19 exits from the tube through window 20, forming an annular laser beam 21. The cooling system 15 enables a cooling fluid such as water to be circulated through the channels 13 and 14.

The 45° skewing of the injection axes with respect to the tube axis and the injection of the gas at supersonic speed cause a turbulent, high-speed flow of gas in the tube. This results in a homogenous electrical discharge, which besides can take place at a much higher gas pressure than in the prior art laser.

Heating of the laser gas in the tube is also reduced due to the high rate of flow. Cooling the gas injection electrode with flowing water helps prevent arcing of the electrical discharge and extends electrode life. The two resonator mirrors are located outside the electrical discharge zone, so their life is also extended.

The laser generator according to the invention makes it possible to obtain electrical discharges with a high specific power. Specific powers approximately three times greater than in the prior art have been obtained using a 50 mm-diameter discharge tube. It is thus possible to make laser generators having a high output power or providing output powers equal to those of generators according to the prior art, yet being of smaller size.

The table below gives numerical values as an indication of the performance of four laser generators according to the invention, which use a mixture consisting of nitrogen, 4 to 6% carbon dioxide and 50% helium. As the table shows, the ratio of the pressure Po of the laser gas upstream from the injection channels, as measured for instance in chamber 7, to the pressure P1 of this gas in the electrical discharge zone tends to increase with the diameter of the discharge tube, whereas the specific power of the discharge increases as the diameter of the discharge tube decreases.

| Discharge Tube | | Injection Channels | | | |
|---|---|---|---|---|---|
| Dia. mm | Pressure P1 Torrs | Gas flow moles/s | Qty. | Dia. mm | Ratio Po/P1 | Specific Power W/cm$^3$ |
| 22 | 80 | 0.2 | 12 | 3.1 | 1.8 | 10 |
| 50 | 40 | 0.8 | 12 | 8.0 | 2.2 | 5 |
| 75 | 40 | 1.4 | 12 | 8.5 | 4.0 | 3 |
| 100 | 40 | 2.8 | 24 | 8.4 | 4.0 | 2.5 |

Figure 2:
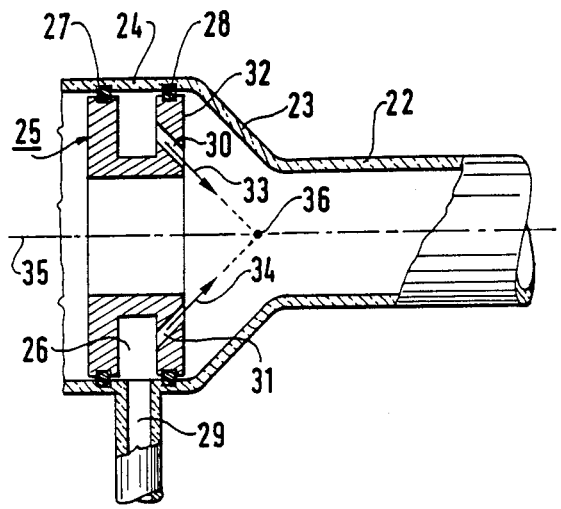
FIG. 2 is a cut away view taken along an axial plane, of an alternate embodiment of an injection electrode in the laser generator according to the invention and the adaptation of this electrode to a small-diameter laser tube.

FIG. 2 is a partial cut-away view, taken axially, of a laser tube with axis 35 having a small-diameter discharge tube 22, joined by a conical part 23 to a cylindrical end piece 24 of larger diameter than tube 22. The injection electrode 25 is disposed coaxially within the end piece 24. The injection chamber 26 of this electrode is an annular groove defining a cylindrical volume of revolution about the axis 35, open toward the electrode's cylindrical outside surface. Two O-rings 27 and 28 are disposed between the cylindrical outside surface of the electrode 25 and the cylindrical inside surface of the tube end piece 24, to seal the chamber 26. An opening 29 is provided in the end piece 24 to supply laser gas to chamber 26. Eight injection channels such as 30 and 31 leave chamber 26, passing through the plane wall 32 of electrode 25 to issue into the discharge tube 22. These channels define injection axes 33 and 34 inclined 45° with respect to the axis 35 of the laser tube and directed towards the other electrode located in the other end of the tube not shown in the drawing. An electrical conductor, also omitted from the drawing, sealably penetrates through the end piece 24 and is connected to the electrode 25 for the purpose of applying the voltage required to produce the electrical discharge.

Figure 3:
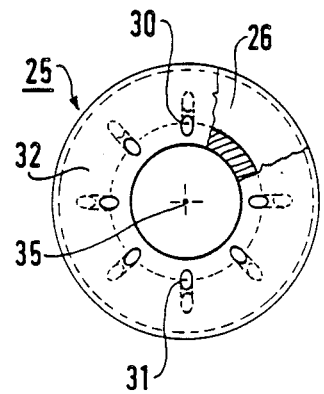
FIG. 3 is a front view of the injection electrode illustrated in FIG. 2.

FIG. 3 shows a front view of the electrode 25, facing the discharge tube 22. As shown, the eight injection channels are evenly spaced around the axis 35. The several injection axes lies on the surface of a cone whose apex is designated by the reference 36 in FIG. 2, located on axis 35, which is also the axis of the cone. The broken off end of end piece 24 actually extends to include a resonator mirror, as represented in FIG. 1.

Figure 4:
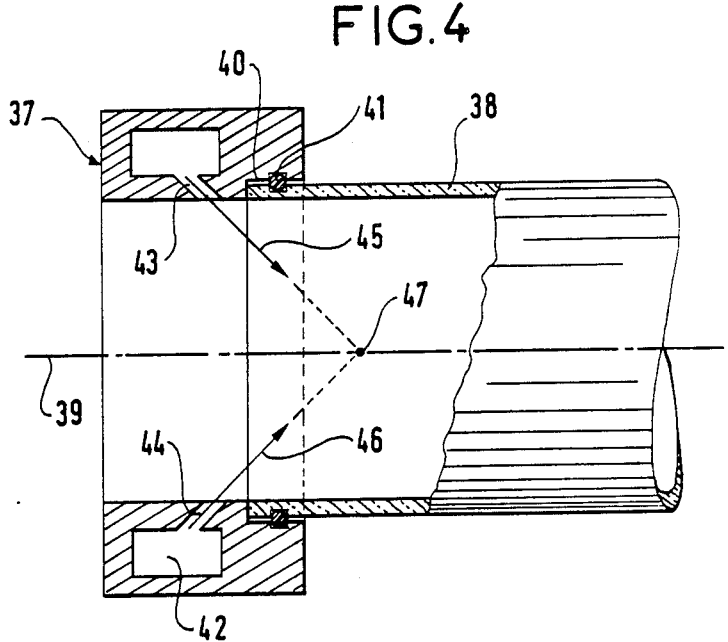
FIG. 4 is a cut-away view taken along an axial plane, of another alternative embodiment of an injection electrode for the laser generator according to the invention, showing the adaptation of this electrode to a large-diameter laser tube.

In the alternative construction shown in FIG. 4, the injection electrode 37 is associated with a relatively large-diameter discharge tube 38, sid tube 38 and electrode 37 being coaxially arranged about axis 39. Electrode 37 has a basically annular shape with a cylindrical recess 40 accommodating the end of tube 38, sealing between the two being provided by an O-ring 41. Electrode 37 comprises an annular chamber 42 which can be made to communicate via an opening omitted from the drawing with a source of laser gas. Injection channels such as 43 and 44 led out of the chamber 42, to the cylindrical inside surface of electrode 37. These channels define injection axes such as 45 and 46 which meet with the main axis 39 at 45° angles. The several injection channels are evenly distributed around axis 39, with their axes lying on the surface of an imaginary cone of revolution about said axis, whose apex 47 would be on same said axis. A tube, omitted from the drawing, but carrying a resonator mirror, can be fitted to the other face of electrode 37, away from recess 40, by means of a similar recess sealed by an O-ring.

Figure 5:
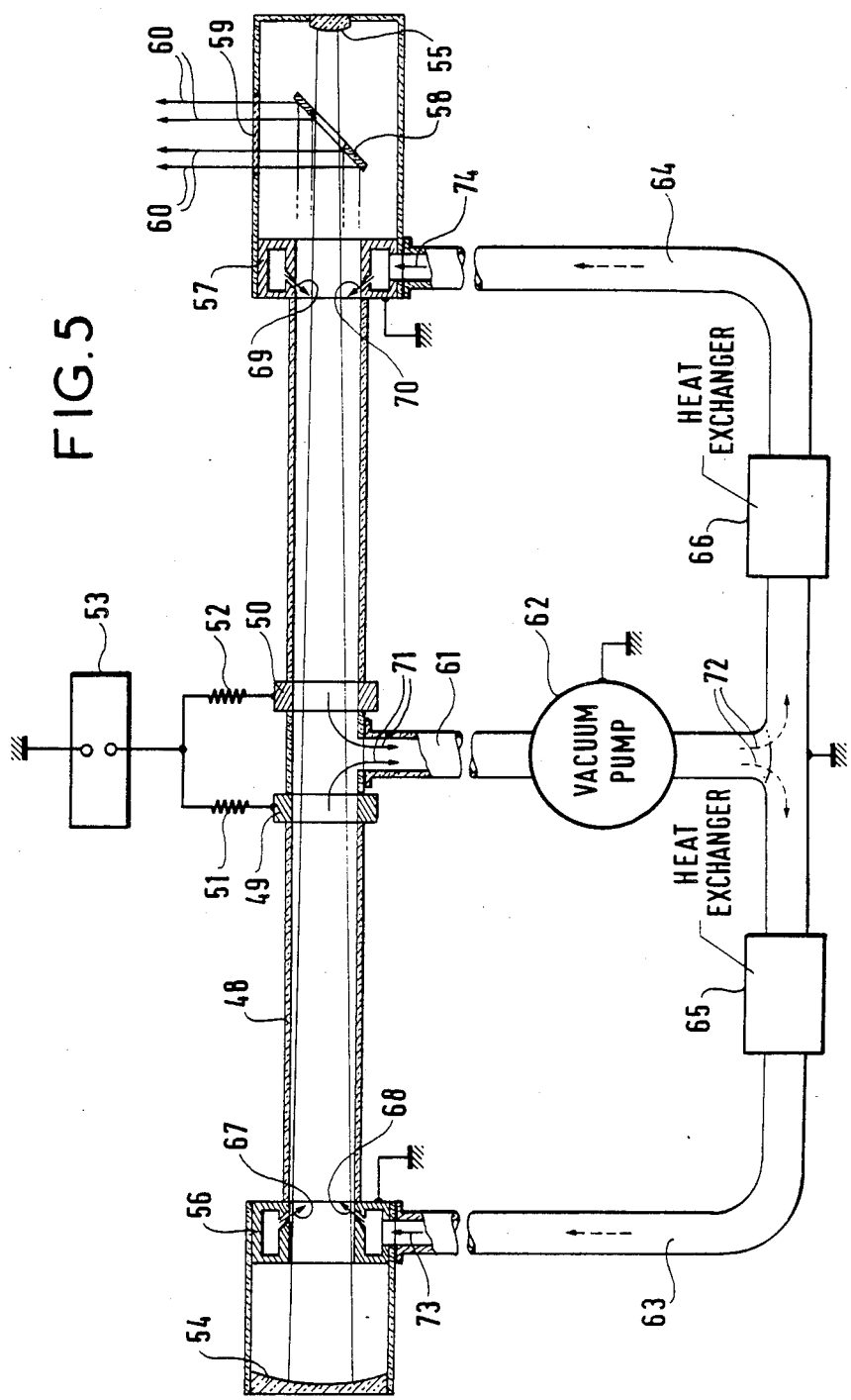
FIG. 5 is a longitudinal cut-away view of a preferred embodiment of the laser generator according to the invention.

Referring now to FIG. 5, the complete gas laser generator diagrammed here comprises a very long insulating discharge tube 48, with two coaxially mounted annular electrodes 49 and 50 midway along the tube. These electrodes are electrically connected via resistances 51 and 52 respectively, to the positive pole of a high voltage generator 53, whose negative pole 62 is connected tot he system ground. Two mirrors are mounted in the ends of the tube 48, namely a concave mirror 54 and a convex mirror 55, like mirrors 4 and 3 respectively of FIG. 1, thus forming an unstable optical resonator along the axis of tube 48. Two gas injection electrodes 56 and 57, similar to electrode 5 of FIG. 1, are mounted near mirrors 54 and 55 respectively toward the ends of the tube, the injection axes of electrodes 56 and 57 being angled toward the middle section of the tube. These electrodes 56 and 57 are connected to system ground. An annular mirror 58, tilted 45° with respect to the axis of the tube and disposed in the cavity between electrode 57 and mirror 55, serves to reflect part of the light oscillating in the tube out of the tube, through a window 59 in the tube, to form an annular laser beam 60. An insulated flow line 61 leads from an opening in the center of the tube 48, between electrodes 49 and 50, to the inlet of a vacuum pump 62. The pump outlet feeds two lines 63 and 64 respectively feeding the injection electrodes 56 and 57. Two heat exchangers 65 and 66 are provided in gas flow lines 63 and 64 respectively. Lines 63 and 64 can be metal pipes for example, which can be connected, together with the pump 22, to the system ground.

Operation of the gas laser generator illustrated in FIG. 5 is as follows:

First, outgas the gas circuit. Then introduce into the system a lasing gas, such as a mixture of carbon dioxide, nitrogen and helium gas. Next, start the pump 62 to cause the laser gas to flow through the system in the direction of the arrows 71 through 74 and to inject the lasing gas at supersonic speed into the tube 48, in the direction of said tube's middle section, through electrodes 56 and 57, along injection axes such as 67 and 68 of electrode 56, and 69 and 70 of electrode 57. Energize electrodes 49 and 50 so as to bring about two simultaneous electrical discharges inside the tube 48, namely one between electrodes 56 and 49 and another between electrodes 57 and 50. This sets up an oscillating laser glow between resonator mirrors 54 and 55, mirror 58 enabling part of the energy from this radiation to be drawn off to form a laser beam 60 which exits the tube via the window 59.

This embodiment is preferred when it is desired to use an unstable cavity with a gain greater than 1. As an indication, a $CO_2$ laser of this type having discharge tube with a 5 cm diameter and a 160 cm working length can deliver a laser output power of 2.5 kW.

The gas laser generators according to the invention can be utilized in welding, cutting or heat treatment machines.

What is claimed is:

1. A gas laser generator of the type comprising:
   means for creating an optical resonator along one axis,
   a discharge tube forming a part of said resonator along said axis,
   means for introducing a laser gas into the tube,
   means for aspirating the laser gas out of said tube,
   first and second cylindrical electrodes fixed to said tube at longitudinally spaced positions and each having a center opening, said electrodes being disposed along said axis so as to be in contact with the laser gas introduced into said tube,
   means for imparting two different electrical potentials respectively to said first and second electrodes so as to bring about between said two electrodes an electrical discharge in the laser gas contained in said tube, said discharge bringing about the formation of an axial laser radiation oscillating within the resonator cavity and passing through the center openings of said first and second electrodes.
   and means enabling part of the laser radiation to leave said cavity to form a laser beam,
   the improvement wherein said means for introducing said laser gas into said tube include gas injection channels arranged in the first electrode, said injection axes of said channels intersecting said axis of said resonator, being directed towards said second electrode and being inclined at an angle of substantially 45° with respect to said axis of said resonator, and the number and the cross-section of said channels being such that said laser gas is injected into said tube at a velocity at least equal to the velocity of sound.

2. Laser generator according to claim 1, wherein said means for introducing said laser gas into said tube further comprise an annular chamber provided in said first electrode, means for connecting said chamber to a source of laser gas and means connecting said first electrode annular chamber to said injection channels.

3. Laser generator according to claim 1, further comprising means for circulating a liquid coolant through said first electrode.

4. Laser generator according to claim 1, further comprising:

a third electrode identical to said second electrode and placed in contact with the laser gas introduced into said tube, and second and third electrodes being disposed in an intermediate section of said tube, and a fourth electrode, similar to said first electrode, placed in contact with said laser gas within said tube, said first and fourth electrodes being disposed respectively in the two end portions of said tube and said axes of the injection channels in the fourth electrode being directed toward the intermediate section of said tube, said means for imparting two different electrical potentials to said first and second electrodes comprising means for furthermore bringing said third electrode to the same potential as said second electrode and said fourth electrode to the same potential as said first electrode, and said means for aspirating the laser gas out of said tube comprising a pump, said pump having an inlet connected via a first flow line to a tube opening located between said second and said third electrode, and having an outlet connected via a second flow line and a third flow line to said first and said fourth electrodes respectively in order to supply laser gas to their gas injection channels.

5. Laser generator according to claim 4, further comprising two heat exchangers respectively disposed on the second and third gas flow lines.

6. In a method of operating a laser generator, said method comprising:
creating an optical resonator along one axis,
arranging a discharge tube in said resonator along said axis,
introducing a laser gas into said tube,
aspirating the laser gas out of said tube,
disposing first and second annular electrodes, each having a center opening, along the axis and within said tube so as to be in contact with the laser gas introduced into said tube,
imparting two different electrical potentials, respectively, to said first and second electrodes so as to bring about between said two electrodes an electrical discharge in the laser gas contained in said tube, said discharge bringing about the formation of an axial laser radiation oscillating within the resonator cavity and passing through the center openings of said first and second electrodes, and
enabling part of the laser radiation to leave said cavity to form a laser beam,
the improvement comprising the steps of:
introducing the laser gas into said tube through gas injection channels arranged in said first electrode whose axes intersect said axis of said resonator and are directed towards said second electrode and are inclined at an angle of substantially 45° with respect to said axis of said resonator, with the number and the cross-section of the channels being such that the laser gas is injected into said tube at a velocity at least equal to the velocity of sound, and
maintaining a laser gas pressure upstream from said injection channels at least fifty percent greater than the laser gas pressure in said tube.

* * * * *